United States Patent
Fujiwara

(10) Patent No.: US 7,522,821 B2
(45) Date of Patent: Apr. 21, 2009

(54) OPTICAL DISC APPARATUS

(75) Inventor: Kazuyuki Fujiwara, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 1111 days.

(21) Appl. No.: 10/656,196

(22) Filed: Sep. 8, 2003

(65) Prior Publication Data

US 2004/0047619 A1 Mar. 11, 2004

(30) Foreign Application Priority Data

Sep. 6, 2002 (JP) ............................. 2002-261133

(51) Int. Cl.
*H04N 5/91* (2006.01)
*H04N 7/00* (2006.01)

(52) U.S. Cl. ..................... 386/96; 386/68; 386/126; 348/515

(58) Field of Classification Search ................ 386/96, 386/126, 68; 348/515
See application file for complete search history.

(56) References Cited

U.S. PATENT DOCUMENTS 5,594,660 A * 1/1997 Sung et al. .................. 715/203
6,163,647 A 12/2000 Terashima et al.
6,510,279 B1 1/2003 Morishita

FOREIGN PATENT DOCUMENTS

| JP | 08-322043   | 12/1996 |
|----|-------------|---------|
| JP | 10-164508   | 6/1998  |
| JP | 11-164256   | 6/1999  |
| JP | 2000-165862 | 6/2000  |
| JP | 2001-069467 | 3/2001  |
| JP | 2001-169249 | 6/2001  |

* cited by examiner

*Primary Examiner*—Thai Tran
*Assistant Examiner*—Girumsew Wendmagegn
(74) *Attorney, Agent, or Firm*—Crowell & Moring LLP

(57) ABSTRACT

In an optical disc apparatus using a decoder chip with no synchronization function of audio data and visual data, when reproduction of the audio data goes ahead of reproduction of the visual data by a period equal to or larger than 100 ms, a reproducing period of a first picture included in each VOBU (Video Object Unit) is shortened than that of other pictures in the same VOBU which are normally reproduced by a normal reproducing period with no lip sync compensation for synchronizing the reproduction of the visual data with the reproduction of the audio data. When leading of the audio data with respect to the video data becomes equal to or smaller than 30 ms, the lip sync compensation is stopped.

9 Claims, 5 Drawing Sheets

OPTICAL DISC APPARATUS

BACKGROUND OF THE INVENTION

1. Field of the Invention

The present invention relates to an optical disc apparatus for reading video data from an optical disc such as a DVD (Digital Versatile Disc), and reproducing the video data as a moving picture on a monitor display apparatus.

2. Description of the Related Art

For recording the video data such as a moving picture taken by a video camera or a moving picture of a TV program received by a TV tuner on an optical disc such as the DVD, the video data are conventionally encoded in compliance with MPEG (Moving Picture Experts Group) standard. Similarly, for reproducing the video data recorded on the optical disc, the encoded video data are read out from the optical disc and decoded in compliance with the MPEG standard.

While the video data are read out from the optical disc, visual data are decoded in compliance with MPEG2 standard, and audio data are decoded incompliance with MP3 standard. Since the visual data and the audio data are independently decoded by different decoding circuits or decoder chips, it is necessary to output the audio data in synchronism with the visual data corresponding to predetermined AV (Audio/Visual) synchronization signals (this process is called "AV synchronization process") for reproducing the moving picture on a screen of the monitor display apparatus.

FIG. 5 illustrates a configuration of a conventional apparatus shown in publication gazette of Japanese patent application 8-322043. Such the conventional apparatus inherently relates to a frame rate converter for converting frame rate of a moving picture. For example, when a video code recorded in a frame rate of 25 frames/sec is displayed in a frame rate of 30 frames/sec, video code data for one picture are repeated per five pictures so that six pictures are displayed in the same period as five pictures. Alternatively, when a video code recorded in the frame rate of 30 frames/sec is displayed in the frame rate of 25 frames/sec, video code data for one picture per six pictures are skipped without being decoded so that five pictures are displayed in the same period as six pictures.

In the conventional apparatus illustrated in FIG. 5, an AV synchronization controller 101 controls for synchronizing reproduction of the audio data with reproduction of the visual data. A frame rate converting controller 102 outputs alternative of a picture repeat request signal RP and a picture skip request signal RS corresponding to feeding of a decoding timing signal TD. A video timing generator 103 generates a display timing signal TH and the decoding timing signal TD corresponding to feeding of a video synchronization signal SY. A decoding controller 104 outputs a decoding start signal DS corresponding to feeding of the decoding timing signal TD. A video code buffer 105 temporarily stores video code data DV and serially feeds the video code data DV to a picture decoder 106. The picture decoder 106 decodes the video code data DV for one picture corresponding to feeding of the decode start signal DS and skips the video code data DV for one picture without decoding corresponding to feeding of the skip request signal RS.

The frame rate converting controller 102 includes a check signal generator 108 for generating a synchronization check timing signal TC, which shows the inherent decoding timing with no frame conversion, corresponding to feeding of a system clock SC. The AV synchronization controller 101 includes a check circuit 107 for checking the AV synchronization corresponding to feeding of a synchronization check timing signal TC. By such a configuration, the AV synchronization process can be executed with no relation to the frame rate conversion.

In the conventional optical disc apparatus, AV synchronization processing function such as the AV synchronization controller 101, the check circuit 107 and the check signal generator 108 are accomplished by hardware, so that the AV synchronization function is built in a chip with decoding function.

In recent years, corresponding to speeding up of working speed of a CPU (Central Processing Unit), the function, which is conventionally accomplished by hardware, can be accomplished by software, so that hardware of an apparatus tends to be simplified and made at a low-cost. Accordingly, for manufacturing the optical disc apparatus at a low-cost, a decoder chip with no AV synchronization function has been practically used.

When the audio data are recorded in the same time period as the visual data, the reproduction of sounds corresponds with the reproduction of moving picture, even though the video data are reproduced with no AV synchronization check in an optical disc apparatus using a decoder chip having no AV synchronization processing function. Alternatively, when the audio data are recorded in different period as the visual data, a phenomenon that the audio data are reproduced ahead of the visual data with respect to an audio gap where no audio data is recorded. Generally, auditory perception of human is more sensitive than visual perception. Thus, even when the audio data are reproduced a little ahead of the visual data, a TV viewer can be amused by the moving picture without unpleasant sensation. When a delay time of the reproduction of the visual data from the reproduction of the audio data becomes equal to or larger than 100 ms, discrepancy between the sound and the moving picture, which is called "lip sync", can obviously be noticed, so that the TV viewer feels something is wrong.

SUMMARY OF THE INVENTION

An object of the present invention is to solve the above-mentioned problems and to provide an optical disc apparatus using a decoder chip having no AV synchronization processing function, in which compensation of the lip sync between the visual data and the audio data (AV synchronization process) can be accomplished by software during the reproducing process of the video data when the reproduction of the audio data goes ahead of the reproduction of the visual data.

An optical disc apparatus using a decoder chip with no synchronization processing function of audio data and visual data in accordance with an aspect of the present invention comprises: an optical pickup device for reading video data from on optical disc; a separator for separating visual data and audio data from the video data; a visual data decoder for decoding the separated visual data; an audio data decoder for decoding the separated audio data; a time information extractor independently for extracting time information of visual data from the visual data and for extracting time information of audio data from the audio data; a lip sync judger for comparing the time information of the visual data with the time information of the audio data at a moment and judges whether reproduction of the audio data goes ahead of reproduction of the visual data by a period equal to or larger than a first predetermined period or not; and a lip sync compensator for compensating lip sync between the audio data and the visual data by shortening reproducing period of a predetermined picture included in the decoded visual data which is reproduced at the moment when the reproduction of the audio data goes ahead of the reproduction of the visual data by the period equal to or larger than the first predetermined period.

By such a configuration, when the leading of the audio data with respect to the visual data is equal to or larger than the predetermined period in which a TV viewer can obviously notice that the lip sync occurs, the reproducing period of a predetermined picture included in the visual data is shortened, so that the delay of the visual data with respect to the audio data is gradually reduced. By repeating such the process, the lip sync between the audio data and the visual data can be compensated while the video data recorded on the optical disc has been reproduced.

DETAILED DESCRIPTION OF THE EMBODIMENT

An embodiment of an optical disc apparatus in accordance with the present invention is described. The optical disc apparatus uses a decoder chip having no AV synchronization processing function. When reproduction of visual data are not synchronized with reproduction of audio data, and the reproduction the audio data goes ahead of the reproduction of the visual data, the visual data are skipped for enabling the compensation of lip sync so that the reproduction of the visual data is synchronized with the reproduction of the audio data while the moving picture is reproduced on a screen of a monitor display apparatus.

Figure 2:
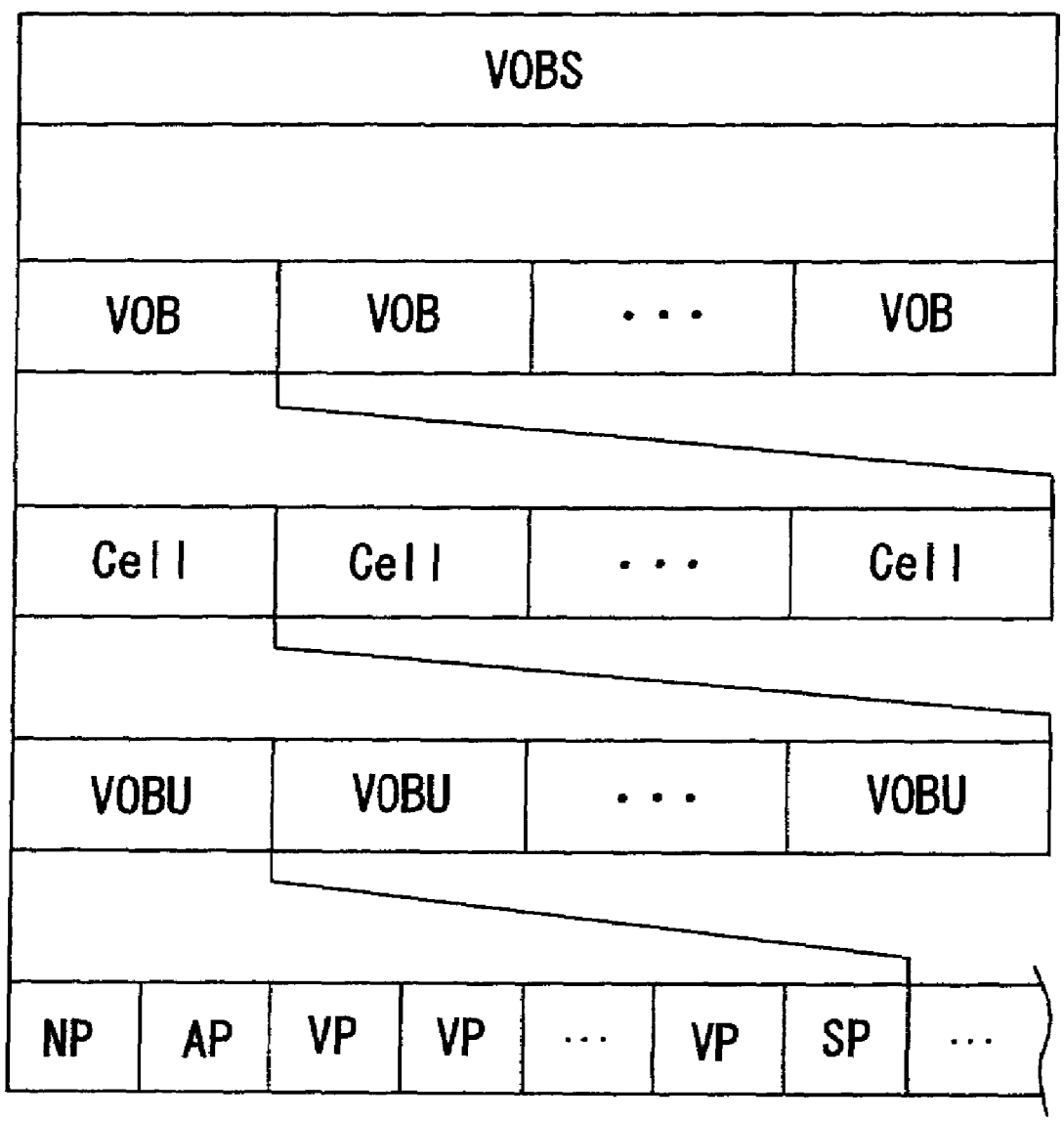
FIG. 2 is a conceptual diagram showing a recorded state of video data recorded in an optical disc.

As shown in FIG. 2, video data are recorded by VOBS (Video Object Set) which corresponds to, for example, one production of movies on an optical disc such as a DVD. One VOBS is constituted by a plurality of VOBs (Video Objects). Each VOB is further constituted by a plurality of cells. Each cell is a unit corresponding to, for example, one scene of a movie. Combination of scenes corresponds to the VOB.

The DVD comprises a multi-stories function by which one movie can be amused by a plurality of different stories. A plurality of stories is recorded on the DVD, and a user can select one among the stories listed on a menu display while the movie is reproduced. The multi-stories function can be accomplished by changing the combination of calls in each VOB.

Each cell is further constituted by a plurality of VOBUs (Video Object Units). Each VOBU is a unit of data for 0.5 to 1.0 sec of moving pictures. The VOBU is constituted by a navigation pack (NP) which is a control information data, an audio data pack (AP), a plurality of visual data packs (VP), a supplemental visual data pack (SP), and so on. Each visual data pack includes data for a plurality of pictures (for example, 15 to 20 frames) which are encoded in compliance with the MPEG2 standard.

The above-mentioned unique data recording system of the optical disc such as the DVD is utilized for correcting time delay of the visual data with respect to the audio data by the unit of VOBU when the reproduction of the audio data goes ahead of the reproduction of the visual data. Reproducing period (display time period) of the data in the first visual data pack in each VOBU is shortened than that of the other visual data packs in the same VOBU. By repeating such the processes with respect to the VOBUs, the time delay between the reproduction of the visual data and the reproduction of the audio data can gradually be reduced, and finally the reproduction of the visual data are synchronized with the reproduction of the audio data.

Figure 1:
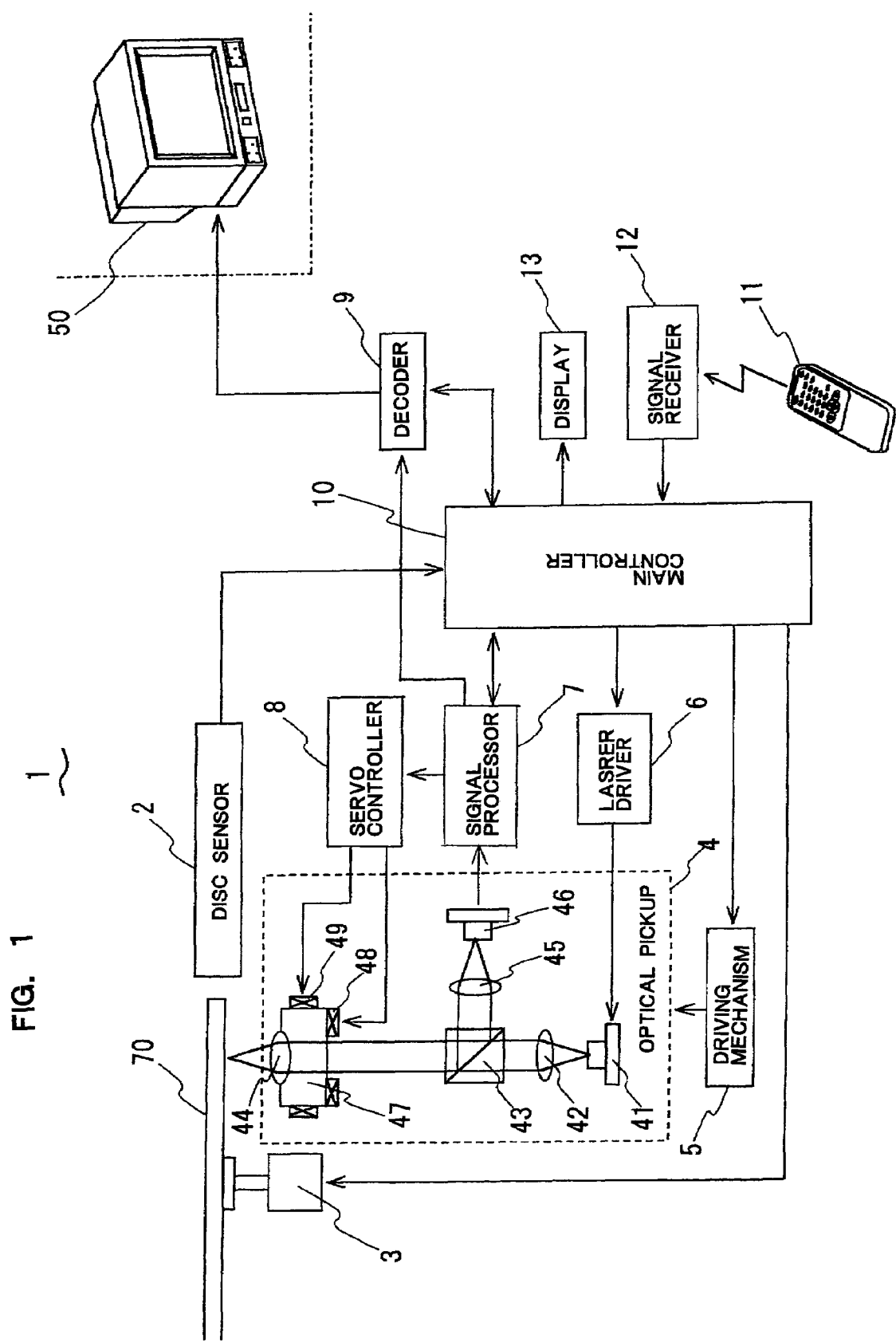
FIG. 1 is a block diagram showing a constitution of an optical disc apparatus in accordance with an embodiment of the present invention.

FIG. 1 shows an electric block configuration of the optical disc apparatus in the embodiment. The optical disc apparatus 1 comprises a disc sensor 2, a spindle motor 3, an optical pickup 4, a driving mechanism 5, a laser driver 6, a signal processor 7, a servo controller 8, a decoder 9, a main processor 10, a remote controller 11, a signal receiver 12 and a display device 13. The servo controller 8 serves as not only a focusing servo controller but also a tracking servo controller.

The main processor 10 constituted by, for example, a ROM for memorizing an operation program, a CPU for executing the operation program, and a RAM temporality for memorizing data to be processed.

The disc sensor 2 senses whether an optical disc 70 is loaded on a tray (not shown) or not and outputs a sensing signal corresponding to the existence or nonexistence of the optical disc 70 to the main processor 20. When the optical disc 70 is loaded on the tray, the optical disc 70 will be chucked on a rotation shaft of the spindle motor 3 so as to be rotated. The rotation of the spindle motor 3 is controlled under the main processor 10.

When the video data are reproduced from the optical disc 70, the optical pickup 4 emits a laser light beam on the optical disc 70, receives a reflected light from the optical disc 70, converts the reflected light to electric signals and outputs the electric signals of video data to the decoder 9. When data are recorded on the optical disc 70, the optical pickup 4 emits light beams pulsatively on the optical disc 70 correspondingly to the contents of the data to be recorded. The optical pickup 4 is moved in a radial direction of the optical disc 70 by the driving mechanism 5, which is constituted by, for example, a linier motor. The movement of the driving mechanism 5 is controlled under the main processor 10. The decoder 9 extracts visual data and audio data from the video data, decodes the visual data in compliance with the MPEG2 standard and decodes the audio data in compliance with the MP3 standard. The decoded visual data and the audio data are outputted to the monitor display apparatus 50, so that a moving picture is reproduced on the screen of the monitor display apparatus 50. Details of the decoder 9 will be described below.

The optical disc 4 comprises a laser diode 41 for emitting laser light beams, a collimator lens 42 for expanding the light beams emitted from the laser diode 41, a beam splitter 43 for transmitting and reflecting the light beams corresponding to incident direction of the light beams and an objective lens 44 for focusing each light beam on the optical disc 70. The light beam focused on the optical disc 70 is reflected on the data recording face of the optical disc 70. The reflected light is received by a photo-sensor 46 through the objective lens 44, the beam splitter 43 and a condenser lens 45.

The emission of the light beam by the laser diode 41 is controlled by the laser driver 6 under the control of the main processor 10. The photo-sensor 46 is constituted by a photo-diodes in which a photo-sensing face is divided into a plurality of areas and each area outputs electric signals corresponding to variation of intensity of received light. Output signals from the photo-sensor 46 are inputted to the signal processor 7.

The objective lens 44 is held on a lens holder 47. A focusing coil 48 and a tracking coil 49 are provided on the lens holder 47. The focusing coil 48 minutely moves or displaces the objective lens 44 on the lens holder 47 in a direction perpendicular to the data recording face of the optical disc 70 by electromagnetic action with a magnet (not shown). The tracking coil 49 minutely moves or displaces the objective lens 44 on the lens holder 47 in a direction parallel to the data recording face of the optical disc 70, similarly to the focusing coil 48.

The signal processor 7 generates RF signals corresponding to the data recorded on the optical disc 70, focusing error signals and tracking error signals based on the output signals from the photo-sensor 46. The RF signals are outputted to the decoder 9, and the focusing error signals and the tracking error signals are outputted to the servo controller 8.

Each focusing error signal corresponds to a quantity of displacement of the concentration point of the light beam focused by the objective lens 44 from the data recording face of the optical disc 70. Each tracking error signal corresponds to a quantity of displacement of the concentration point of the light beam from a data recording track on the optical disc 70. The servo controller 8 controls the current supply to the focusing coil 48 and the tracking coil 49 for moving the objective lens 44 on the lens holder 47 based on the focusing error signals and the tracking error signals. Thus, the concentration point of the light beam can be placed on the data recording track and on the data recording face of the optical disc 70.

The remote controller 11 has a plurality of operation keys, which is operated by a user (TV viewer) for selecting a function among several operations of the optical disc apparatus 1. The remote controller 11 transmits infrared ray signals corresponding to the selection by the user. The signal receiver 12 receives the infrared ray signals from the remote controller 11, and outputs operation signals corresponding to the infrared ray signals to the main processor 10. The display device 13 is provided on a front panel of a housing of the optical disc apparatus 1, and displays the contents of the operations selected by the user through the remote controller 11, an operative condition of the optical disc apparatus 1, and so on.

Figure 3:
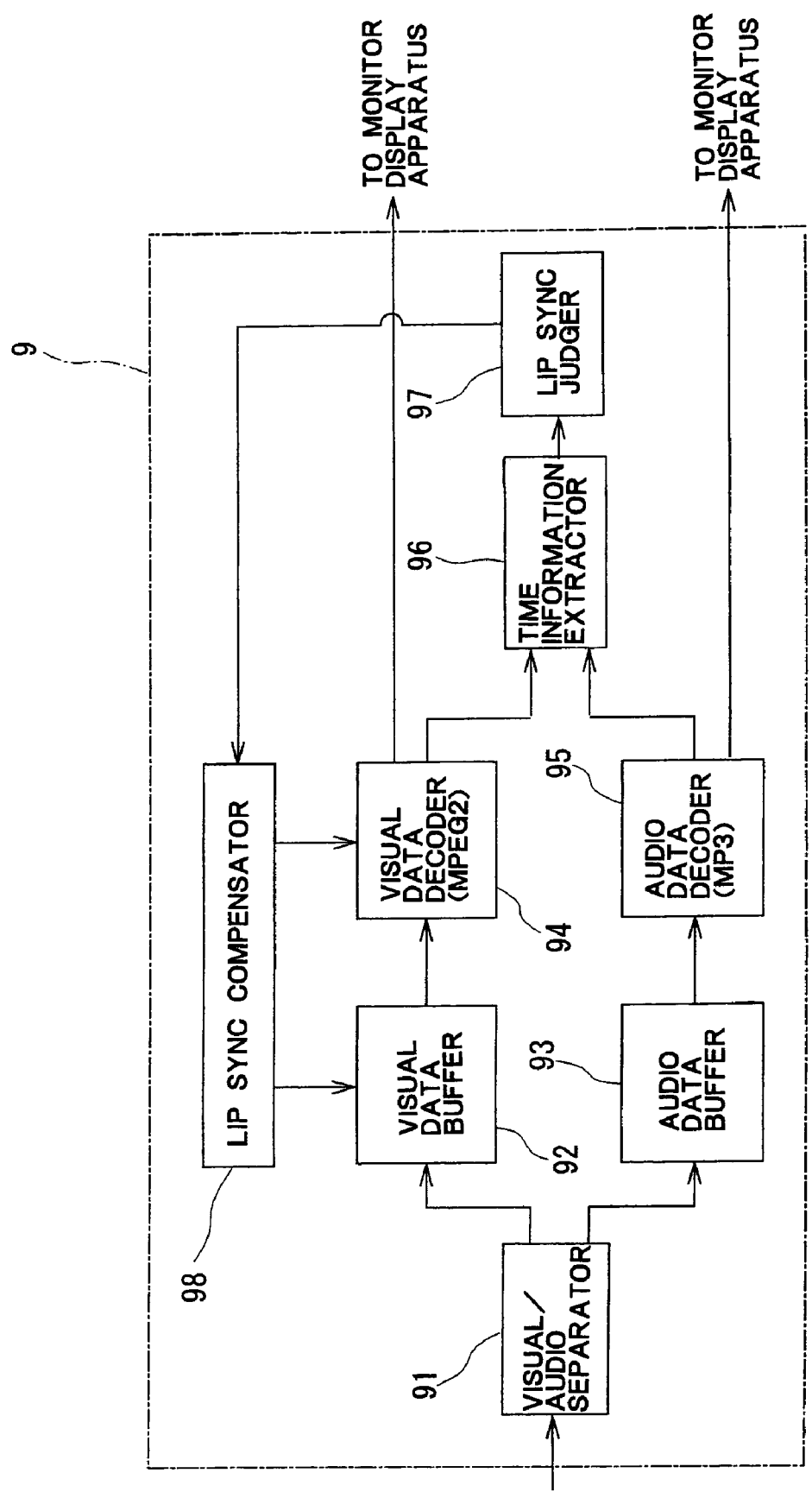
FIG. 3 is a block diagram showing a configuration of a decoder in the optical disc apparatus in the embodiment.

Subsequently, a block diagram of the decoder 9 in this embodiment is illustrated in FIG. 3. The decoder 9 comprises a visual/audio separator 91, a visual data buffer 92, an audio data buffer 93, a visual data decoder 94, an audio data recorder 95, a time information extractor 96, a lip sync judger 97 and a lip sync compensator 98.

The visual/audio separator 91 separates the audio data and the visual data from the RF signals outputted from the signal processor 7. The visual data buffer 92 temporarily stores the separated visual data. The audio data buffer 93 temporarily stores the separated audio data. The visual data decoder 94 serially decodes the visual data for one picture (one frame) by one, which is serially outputted from the visual data buffer 92, in compliance with the MPEG2 standard. The audio data decoder 95 decodes the audio data outputted from the audio data buffer 93 in compliance with the MP3 standard. The time information extractor 96 extracts time information at the moment with respect to the visual data and the audio data, which are reproduced at the moment, from the decoded visual data and the decoded audio data. The lip sync judger 97 compares the time information of the visual data with the time information of the audio data, and judges whether the reproduction of the audio data is synchronized with the reproduction of the visual data or not. When the reproduction of the audio data is not synchronized with the reproduction of the visual data, the lip sync judger 97 further judges either of the reproduction of the audio data and the reproduction of the visual data goes ahead. Furthermore, the lip sync judger 97 measures a delay time between the audio data and the visual data. The lip sync compensator 98 compensates the lip sync under a predetermined condition, when the lip sync occurs between the audio data and the visual data.

Since the visual data decoder 94 and the audio data decoder 95 are constituted by, for example, MPEG decoder chips having no AV synchronization processing function, the lip sync between the audio data and the visual data is compensated by software process owing to the lip sync compensator 98, when the reproduction of the audio data is not synchronized with the reproduction of the visual data.

Subsequently, the compensation of the lip sync between the audio data and the visual data is described. The lip sync between the audio data and the visual data occurs not only due to the above-mentioned audio gap in which no audio data is recorded with respect to the visual data, but also due to reading error of the video data caused by scratch or dust on the surface of the optical disc 7. The lip sync occurs not only due to the reproduction of the audio data going ahead of the reproduction of the visual data, but also the reproduction of the visual data going ahead of the reproduction of the audio data.

Since the response of visual perception of human is slower like the after image phenomenon, the visual perception cannot correspond to sudden variation of the brightness or quick change of the image. On the other hand, auditory perception of human is more sensitive than visual perception in comparison with each other. Thus, it is preferable to compensate the reproduction of the visual data so as to synchronize with the reproduction of the audio data, when the reproduction of the audio data is not synchronized with the reproduction of the visual data, since it is difficult to be noticed by the TV viewer that the lip sync is compensated. Furthermore, the TV viewer tends to notice the occurrence of the lip sync when the reproduction of the audio data goes ahead of the reproduction of the visual data.

In this embodiment, the lip sync is compensated in compliance with the auditory perception and the visual perception of human when the reproduction of the audio data goes ahead of the reproduction of the visual data and the delay time of the visual data with respect to the audio data becomes equal to or larger than 100 ms, at which the TV viewer can notice the occurrence of the lip sync.

The time information extractor 96 independently extracts the time information included in the visual data and the time information included in the audio data. When the reproduction of the audio data is synchronized with the reproduction of the visual data, the time information extracted from the audio data coincides with the time information extracted from the visual data. Alternatively, when the reproduction of the audio data is not synchronized with the reproduction of the visual data, the time information extracted from the audio data is a little different from the time information extracted from the visual data. Thus, the lip sync judger 97 compares the time information extracted from the audio data with the time information extracted from the visual data. When the reproduction of the audio data goes ahead of the reproduction of the visual data and the delay time of the visual data with respect to the audio data is equal to or larger than 100 ms, the lip sync judger 97 outputs an "AV sync on signal" for switching on an AV synchronization mode to the lip sync compensator 98 for executing the lip sync compensation process.

When the "AV sync on signal" is outputted from the lip sync judger 97, the lip sync compensator 98 shortens the reproducing period (display time period) of the data of the first visual data pack in each VOBU (see FIG. 2) than that of the other visual data packs in the same VOBU. By repeating such the processes with respect to a plurality of the VOBUs, the time delay of the visual data with respect to the audio data can gradually be reduced. For example, when the reproducing period of one picture in a normal process, in which the lip sync compensation process is not executed, is set to be 30 ms, the reproducing period of the first picture in each VOBU in the lip sync compensation process is selected to be 20 ms. If the reproducing period of the first picture in the VOBU is extremely shortened in the lip sync compensation process, the TV viewer can notice that the picture is suddenly changed. Therefore, the quantity of compensation (compensation period) in one lip sync compensation process is made smaller, and the delay time of the visual data with respect to the audio data can gradually be shortened by installments.

The lip sync judger 97 judges whether the leading of the audio data with respect to the visual data has been equal to or smaller than 30 ms or not. For example, when the leading of the audio data with respect to the visual data has been equal to or smaller than 30 ms, the TV viewer rarely notices the occurrence of the lip sync between the audio data and the visual data. Furthermore, the reproducing period of one picture in the normal process with no lip sync is at most 30 ms. Thus, even when the lip sync compensation process, in which the reproducing period of the first picture in each VOBU is made shorten, is repeated under a condition that the leading of the audio data with respect to the visual data is equal to or smaller than 30 ms, the reproduction of the visual data will go ahead of the reproduction of the audio data. When the leading of the audio data with respect to the visual data becomes equal to or smaller than 30 ms, the lip sync judger 97 outputs an "AV sync off signal" to the lip sync compensator 98 for switching off the AV synchronization mode so as not to compensate the lip sync between the audio data and the visual data.

Figure 4:
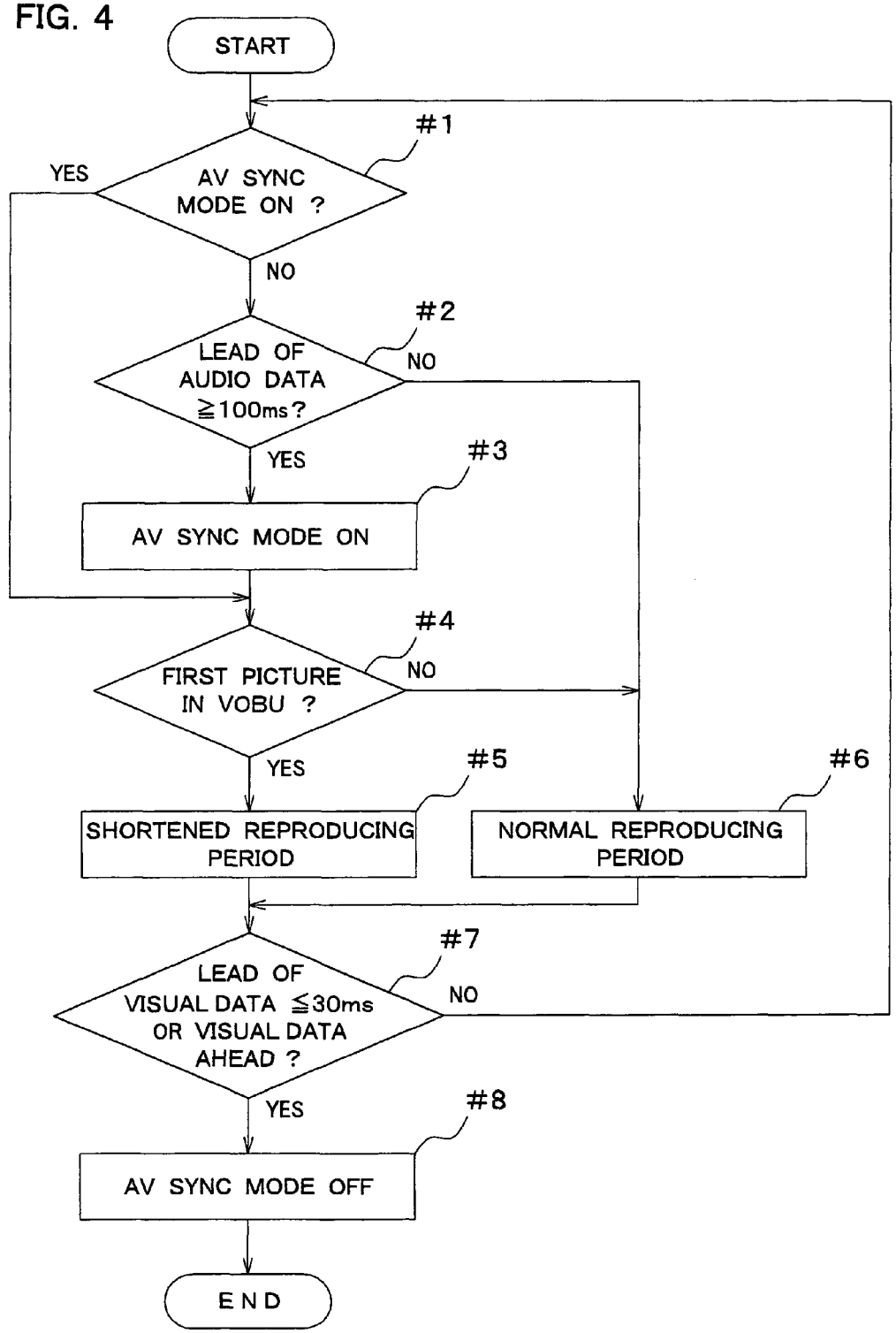
FIG. 4 is a flowchart showing a lip sync compensation process (AV synchronization process) in the embodiment.
Figure 5:
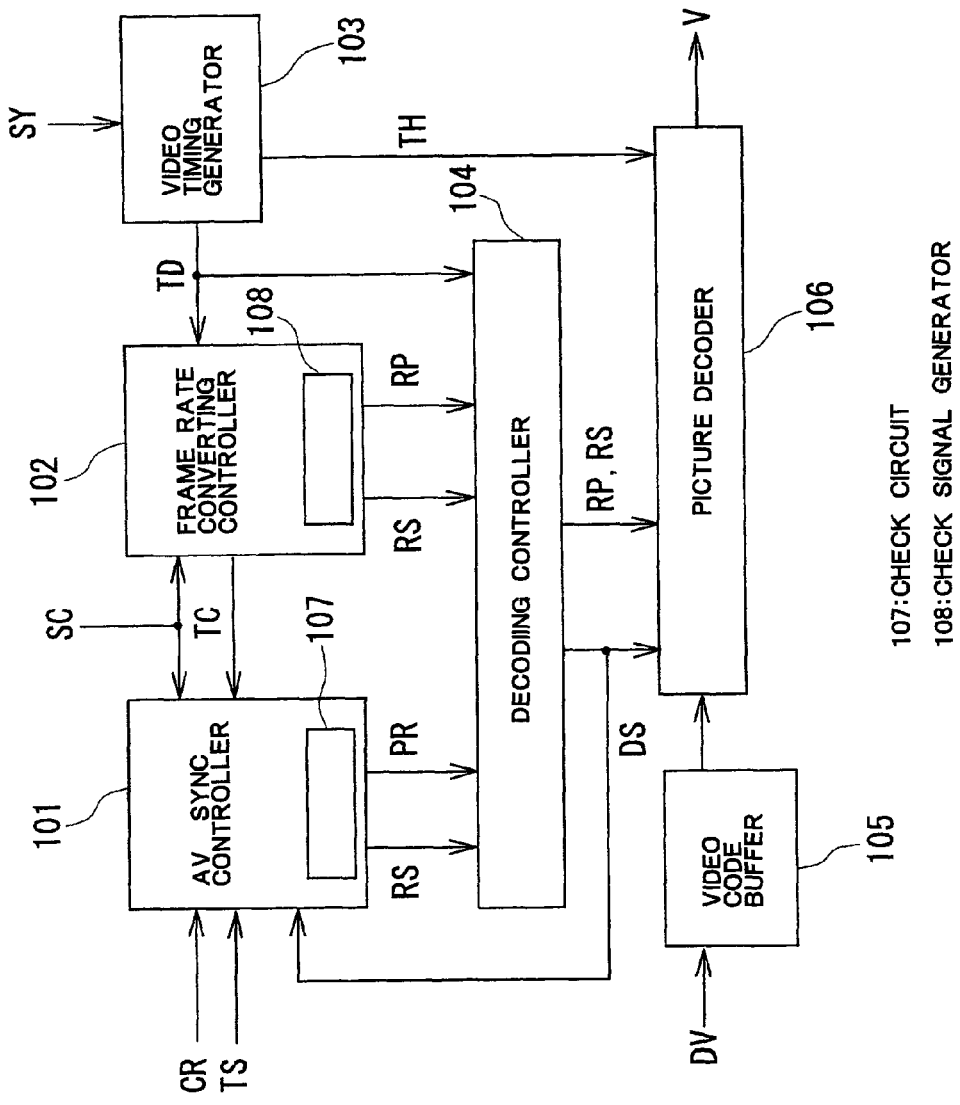
FIG. 5 is a block diagram showing a configuration of a conventional frame rate converter.

Subsequently, the lip sync compensation process is described with reference to a flowchart illustrated in FIG. 4. The flow illustrated in FIG. 4 is executed when the video data pack VP of each picture included in each VOBU (see FIG. 2) is decoded.

At the start, the lip sync judger 97 judges whether the AV synchronization mode is switched on or not (#1). In FIG. 4, the phrase of "AV SYNC MODE ON" means that the "AV sync on signal" is outputted from the lip sync judger 97 to the lip sync compensator 98 for executing the lip sync compensation process. In an initial step where the lip sync compensation process has not been executed, the "AV synch. on signal" has not been outputted, so that the lip sync judger 97 compares the time information of the audio data with the time information of the visual data outputted from the time information extractor 96, and judges whether the leading of the audio data with respect to the visual data is equal to or larger than 100 ms or not (#2).

When the reproduction of the audio data goes ahead of the reproduction of the visual data by a period equal to or larger than 100 ms ("Yes" in the step #2), the lip sync judger 97 outputs the "AV sync on signal" to the lip sync compensator 98 for starting the lip sync compensation process (#3). By such the operations, the lip sync compensator 98 starts the lip sync compensation process for compensating the reproduction of the visual data so as to be synchronized with the reproduction of the audio data.

When the "AV sync on signal" is outputted in the steps #1 and #3, the lip sync compensator 98 judges whether visual data to be decoded next time corresponds to the first picture in the VOBU or not (#4). In this embodiment, the delay of the visual data with respect to the audio data is compensated by shortening the reproducing period of the first picture in each VOBU. Thus, when the visual data of the picture to be decoded next time corresponds to the first picture in the VOBU ("Yes" in the step #4), the lip sync compensator 98 executes a reproducing period shortening process in a manner so that the visual data decoder 94 decodes the first picture in each VOBU in a reproducing period (for example, 20 ms) shorter than the normal reproducing period (for example, 30 ms) (#5). Alternatively, when the visual data of the picture to be decoded next time does not correspond to the first picture in the VOBU ("No" in the step #4), the visual data decoder 94 decodes the visual data in the normal reproducing period (30 ms) (#6). In addition, when the reproduction of the audio data does not go ahead of the reproduction of the visual data by a period equal to or larger than 100 ms in the step #2, the flow is skipped to the step #6 and the visual data decoder 94 decodes the visual data in the normal reproducing period.

When the visual data is decoded in the step #5 or in the step #6, the lip sync judger 97 judges whether the leading of the audio data with respect to the visual data is equal to or smaller than 30 ms or not and whether the visual data goes ahead of the audio data or not (#7). In this embodiment, when the reproduction of the visual data goes ahead of the reproduction of the audio data, the lip sync compensation is not executed, as mentioned above. Furthermore, when the leading of the audio data with respect to the visual data becomes equal to or smaller than 30 ms, the lip sync compensation process is stopped for preventing the reproduction of the visual data going ahead of the reproduction of the audio data due to excessive lip sync compensation. Thus, when the lip sync judger 97 judges "Yes" in the step #7, the lip sync judger 97 outputs the "AV sync off signal" to the lip sync compensator 98, and the lip sync compensation process of the audio data and the visual data is completed (#8). When the reproduction of the visual data does not go ahead of the reproduction of the audio data and the leading of the audio data with respect to the visual data is larger than 30 ms ("No" in the step #7), it is necessary to continue the execution of the lip sync compensation process between the audio data and the visual data. The lip sync judger 97 has been outputted the "AV sync on signal", and returned to the step #1 for continuing the execution of the flow with respect to the next picture.

In this embodiment, the lip sync compensation process is executed for shortening the reproducing period of the first picture in each VOBU. The present invention, however, is not restricted by the above-mentioned description, so that it is possible to execute the lip sync compensation process for shortening the reproducing time of another picture except the first picture, for example, a predetermined number of picture or the last picture in the VOBU. Furthermore, since the judgmental standard period of the leading of the audio data with respect to the visual data for starting the lip sync compensation process is not restricted by 100 ms, it is possible to select another judgmental standard period. Similarly, since the judgmental standard period of the leading of the audio data with respect to the visual data for stopping the lip sync compensation process is not restricted by 30 ms, it is possible to select another judgmental standard period.

This application is based on Japanese patent application 2002-261133 filed in Japan dated Sep. 6, 2002, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disc apparatus using a decoder chip with no synchronization function of audio data and visual data comprising:
   an optical pickup device for reading video data from an optical disc;
   a separator for separating visual data and audio data from the video data;
   a visual data decoder for decoding the separated visual data;
   an audio data decoder for decoding the separated audio data;
   a time information extractor independently for extracting time information of visual data from the visual data and for extracting time information of audio data from the audio data;
   a lip sync judger for comparing the time information of the visual data with the time information of the audio data at a moment and judges whether reproduction of the audio data goes ahead of reproduction of the visual data by a period equal to or larger than a first predetermined period or not; and
   a lip sync compensator for compensating lip sync between the audio data and the visual data by shortening the reproducing period of data in a first visual data pack in each VOBU (Video Object Unit), which includes a combination of visual data of a plurality of pictures, included in the decoded visual data which is reproduced at the moment, so that reproducing period of the data in the first picture in each VOBU in lip sync compensation process is shorter than reproducing period of one picture in normal process when lip sync compensation process is not executed, when the reproduction of the audio data goes ahead of the reproduction of the visual data by the period equal to or larger than the first predetermined period, and repeatedly shortening the reproducing period, thereby gradually reducing a time delay between the reproduction of the visual data and the reproduction of the audio data.

2. The optical disc apparatus in accordance with claim 1, wherein
   the lip sync judger further judges whether leading of the audio data with respect to the visual data is equal to or smaller than a second predetermined period or not; and
   the lip sync compensator stops the compensation of the lip sync between the audio data and the visual data when the leading of the audio data with respect to the visual data is equal to or smaller than the second predetermined period.

3. The optical disc apparatus in accordance with claim 1, wherein
   the first predetermined period is 100 ms.

4. The optical disc apparatus in accordance with claim 2, wherein
   the second predetermined period is 30 ms.

5. The optical disc apparatus in accordance with claim 1, wherein
   a normal reproducing period with no lip sync compensation is about 30 ms and the lip sync compensator shortens the reproducing period of the predetermined picture included in the decoded visual data to be 20 ms.

6. The optical disc apparatus in accordance with claim 1, wherein the audio data are decoded in compliance with MP3 standard and the visual data are decoded in compliance MPEG2 standard.

7. The optical disc apparatus in accordance with claim 1, wherein
   when the visual data goes ahead of the audio data, or when audio data goes ahead of the visual data but leading of the audio data with respect to the visual data is equal to or smaller than a second predetermined period, the lip sync compensator does not compensate the lip sync between the audio data and the visual data.

8. The optical disc apparatus in accordance with claim 1, wherein all of the data in each VOBU is used in the lip sync compensation process.

9. The optical disc apparatus in accordance with claim 1, wherein the lip sync compensator processes the data in each VOBU without skipping the data.

* * * * *